Dec. 7, 1926.  H. C. GATES  1,609,810

MARCELLING IRON

Filed Feb. 27, 1926

Inventor
HARRY C. GATES

By
Attorney

Patented Dec. 7, 1926.

1,609,810

UNITED STATES PATENT OFFICE.

HARRY C. GATES, OF MINNEAPOLIS, MINNESOTA.

MARCELLING IRON.

Application filed February 27, 1926. Serial No. 91,252.

This invention relates to marcelling or curling irons and the primary object is to provide an efficient, practical and highly novel construction of iron in which a pair of curling tongs are provided with a longitudinally movable element which is reciprocated back and forth by successive closing movements of the tongs, the purpose being to give the hair a double wave or curl which is more pleasing to the eye than when the curls are effected in one plane only which creates an artificial or unnatural appearance. Further and more specific objects will be disclosed in the course of the following specification, reference being had to the accompanying drawing, in which:

Figure 1:
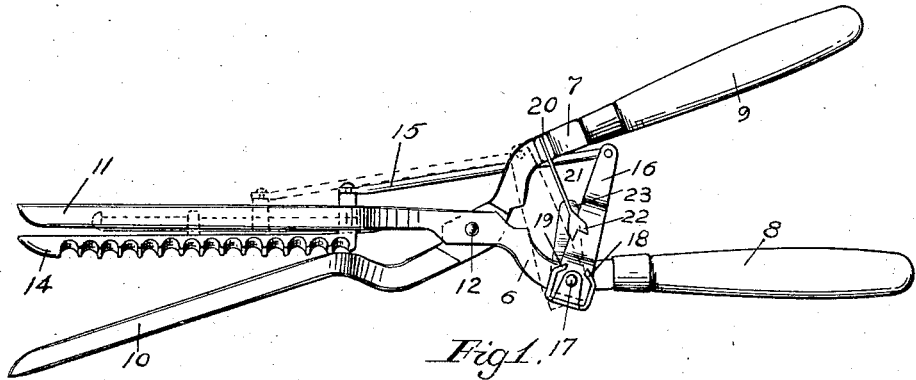
Fig. 1 is a left side elevation of the device, in an open or hair receiving position.
Figure 2:
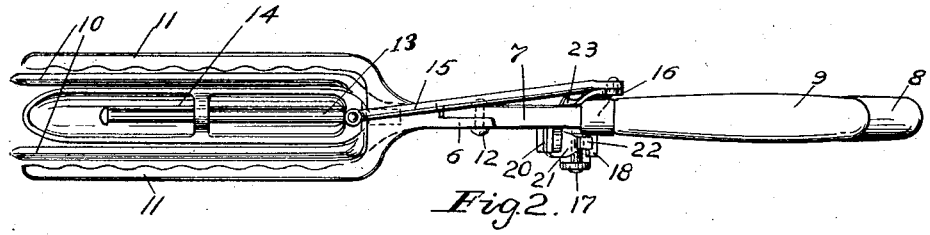
Fig. 2 is a top or plan view of the device.

Referring to the drawings more particularly and by reference characters 6 and 7 designate crossed levers or tong members pivoted as at 12, having handles 8 and 9 at one end and continue in forks 10 and 11 at the other or front ends. The inner sides or edges of the fork tines 11 (of the lever 6) are provided with corrugations so as to prevent the hair from slipping back or forth when clamped between the tines of the forks 10 and 11.

Secured to the tong 6 and extending longitudinally out between the tines 11 is a centrally arranged rod 13 which slidably carries the iron 14. This iron normally extends below the tines 10 and 11 and is provided with transverse corrugations which engage the span of hair stretched between and clamped by the tongs. Thus, the hair is curled in one plane or direction by the action of the tines 10, which, in clamping the hair, passes up between the sides of the iron 14 and the tines 11, and a second curl, in another plane, is effected by moving the iron 14 longitudinally between the tines.

Figure 3:
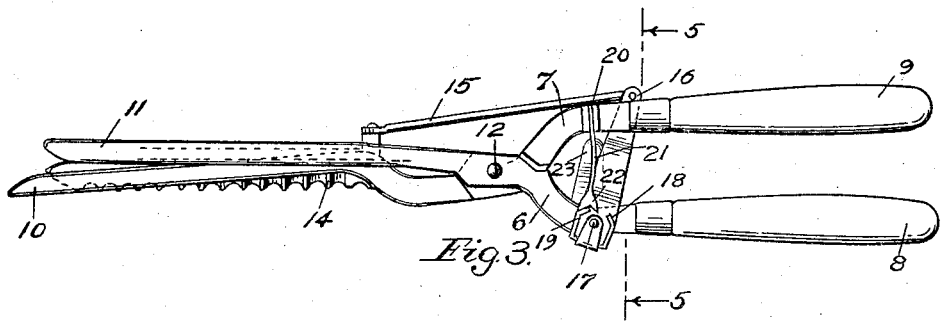
Fig. 3 is a left side elevation of the device, in a closed or hair curling position.
Figure 4:
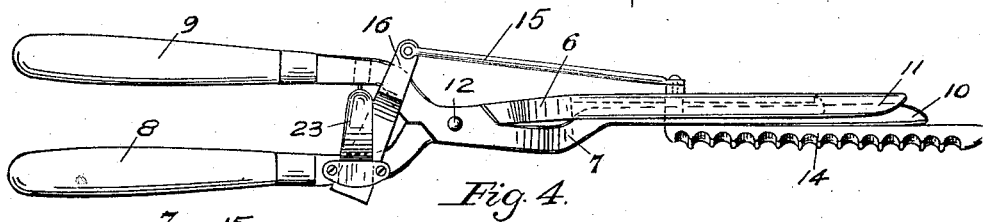
Fig. 4 is a right side elevation of the device as shown in Fig. 3, but with the reciprocating iron in its extended position.
Figure 5:
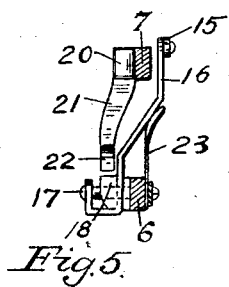
Fig. 5 is a sectional detail elevation as on the line 5—5 in Fig. 3.

A reciprocating movement is imparted to the iron 14, by a rod 15, which is connected at one end to an arm 16 pivoted, as at 17, to the lever 7. The arm 16 is provided near its lower end, and at opposite side of the pivot 17, with a pair of dogs 18 and 19, comprising laterally bent flanges of the arm. Rigidly secured, as at 20, to the tong 6, is a spring actuator member 21, the lower end of which is provided with a notched pawl 22 which co-acts with the dogs 18 and 19 to shift the arm 16 back and forth as the tongs are successively closed. The width of the pawl 22 is greater than the distance between the dogs 18 and 19 so that when it is brought down the V-shaped notch in the pawl will cause it to engage and spring over to one pawl or the other depending upon which it engages first. Thus, in Fig. 1 the pawl 22 has just completed its engagement with the dog 18 to move the arm 16 rearwardly, and in doing so has moved the dog 19 more directly over the pivot 17 than the dog 18. Now, when the tongs are again compressed the front (or left) end of the pawl 22 will engage the dog 19, and the notch in the pawl will cause it to slip over to the position shown in Fig. 3. Now, when the handles 8—9 are completely compressed the pawl 22 and spring 21 will cause a shifting of the arm 16 to the forward (or left) position. And upon the next opening and closing of the tongs the pawl 22 will re-engage the dog 18. A spring member 23 is secured to the lever 7 and frictionally engages the arm 16 in such a manner that it will releasably secure it in its forward and rearward positions, and in so doing will prevent any slipping or partial movement of the iron 14 except when it is actuated by the movement of the tongs as above indicated.

It is understood that suitable modifications may be made in the general design and structural details of the invention as herein shown and described, provided, however, that said modifications come within the spirit and scope of the appended claims.

Having now therefore fully shown and described my invention, what I claim to be new and desire to protect by Letters Patent is:

1. A device of the character described comprising a pair of tongs, a curling iron associated with said tongs and movable longitudinally with respect thereto, means adapted to be actuated by closing the tongs for moving said iron to front and rear positions, successively, and means for releasably locking the iron in the front or rear position to which it is moved.

2. A device of the character described, comprising a pair of tongs, a curling iron associated with said tongs and movable longitudinally with respect thereto, means adapted to be actuated by closing the tongs for moving said iron to front and rear positions, successively, and spring means for releasably retaining said iron in various positions.

3. A device of the character described comprising a pair of tongs, a curling iron associated with said tongs and movable longitudinally with respect thereto, an arm pivoted to one of said tongs and connected with said iron for reciprocating the same, said arm having a pair of dogs, a pawl secured to the other arm and having a notched end for alternate engagement with said dogs, and spring means for releasably securing the arm in either of two positions.

In testimony whereof I affix my signature.

HARRY C. GATES.